(12) United States Patent
Isogai et al.

(10) Patent No.: US 6,794,785 B2
(45) Date of Patent: Sep. 21, 2004

(54) ALTERNATOR FOR VEHICLES

(75) Inventors: Nobou Isogai, Nagoya (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/453,586

(22) Filed: Jun. 4, 2003

(65) Prior Publication Data

US 2004/0000832 A1 Jan. 1, 2004

(30) Foreign Application Priority Data

Jun. 26, 2002 (JP) .......................... 2002-186101

(51) Int. Cl.⁷ .......................... H02K 3/00; H02K 3/12; H02K 3/24
(52) U.S. Cl. ....................... 310/184; 310/207
(58) Field of Search ................... 310/179, 180, 310/184, 195, 198, 206, 207, 208, 58, 60 R

(56) References Cited

U.S. PATENT DOCUMENTS

| | | | | |
|---|---|---|---|---|
| 5,122,705 A | * | 6/1992 | Kusase et al. ............ | 310/68 D |
| 5,998,903 A | | 12/1999 | Umeda et al. | |
| 6,140,735 A | * | 10/2000 | Kato et al. .................. | 310/201 |
| 6,268,678 B1 | * | 7/2001 | Asao et al. .................. | 310/201 |
| 6,373,163 B1 | | 4/2002 | Oohashi et al. | |
| 6,448,681 B1 | * | 9/2002 | Matsunaga et al. ......... | 310/179 |
| 6,459,187 B1 | * | 10/2002 | Oohashi et al. ............. | 310/216 |
| 6,469,413 B1 | * | 10/2002 | Oohashi et al. ............. | 310/184 |
| 6,501,205 B1 | * | 12/2002 | Asao et al. ................. | 310/184 |
| 6,504,283 B1 | * | 1/2003 | Asao et al. ................. | 310/254 |
| 6,624,544 B2 | * | 9/2003 | Higashino et al. .......... | 310/201 |
| 2001/0038251 A1 | | 11/2001 | Nakamura | |
| 2002/0036439 A1 | | 3/2002 | Ooiwa | |

FOREIGN PATENT DOCUMENTS

| | | |
|---|---|---|
| EP | 1 107 425 A2 | 6/2001 |
| EP | 1 109 289 A | 6/2001 |
| JP | A 2001-178054 | 6/2001 |

* cited by examiner

Primary Examiner—Tran Nguyen
(74) Attorney, Agent, or Firm—Oliff & Berridge, PLC

(57) ABSTRACT

A stator winding of an alternator has two poly-phase windings. Each of phase coils, e.g., X-phase coil in one of poly-phase windings, is provided by a continuous wire. The phase coil is accommodated in corresponding slots in a layered manner along a radial direction, therefore, the phase coil forms layers in the slots and may be identified as location of layers in the slots. The phase coil has a plurality of crossing portion that links the layers in different slots distanced by a magnetic pole pitch, and two output portions extending beyond the stator winding. In the phase coil, only one crossing portion is formed to link the same layers in different slots, and the other crossing portions are formed to link different layers in different slots.

10 Claims, 11 Drawing Sheets

ALTERNATOR FOR VEHICLES

CROSS REFERENCE TO RELATED APPLICATIONS

This application is based on Japanese Patent Application No. 2002-186101 filed on Jun. 26, 2002 the contents of which are incorporated herein by reference.

BACKGROUND OF THE INVENTION

1. Field of the Invention

The present invention relates to an alternator for vehicles that is mounted in a vehicle such as a passenger car or a motor truck.

2. Description of Related Art

In recent years, an engine main unit for vehicles has become lightweight in efforts to improve fuel economy as a countermeasure against environmental problems. Meanwhile, an engine driving torque has been increased in efforts to improve drivability. On the other hand, an alternator for vehicles that is driven by an engine is attached directly to the engine main unit with a bracket between them. Vibrations of the engine are likely to be conveyed to the alternator. The vibration resistance of the alternator must therefore be improved. Moreover, a vehicle engine speed at idle has decreased, and an engine room has been narrowed in order to ensure a large space for a vehicle compartment. Accordingly, the alternator for vehicles is requested to produce high power and to be compact. In addition, the heat resistance of the alternator against a rise in the temperature of the engine room is requested to improve. Moreover, the alternator for vehicles must generate little noise in compliance with a social demand for reduction in exterior noise or in pursuit of improvement in productivity derived from improvement in interior silence. Needless to say, the improvement in performance must be achieved at low cost.

U.S. Pat. No. 5,998,903 (JP-A-11-155270) discloses an alternator for vehicles that contributes to realization of a compact design, high power, and low noise. Herein, a stator winding is formed using a plurality of conductor segments. Conductor segments in different layers of different slots are coupled to each other in order to form a winding that offers a high space factor and a low resistance. Moreover, two three-phase windings are mounted in one stator. However, welding is required to couple segments. This poses a problem in that as the number of segments in slots increases, the number of welding machines, the number of welding steps, and the number of insulating steps increase. Moreover, as the number of segments in slots increases, the distance between welds is shortened. This poses a problem in that a short circuit is liable to occur between the welds.

U.S. Pat. No. 6,373,163 (Japan Patent No. 3155534) discloses an alternator for vehicle having a phase coil, e.g., X-phase, as shown in FIG. 16. The phase coil is provided by at least four wires each having a length corresponding to the circumferential length of a stator core. The wires are joined in order to thus create a coil assigned to one phase. For joining a plurality of wires, welding is required as shown in FIG. 16. The costs for a welding machine, a welding process, and an insulation process increase. Moreover, coil ends are elevated because of welds. This contradicts the trend to a compact design.

SUMMARY OF THE INVENTION

Accordingly, an object of the present invention is to provide an alternator for vehicles that is compact and low-cost and offers high power.

It is another object of the present invention to improve the heat resistance of the alternator by devising the shape of a coil end.

It is still another object of the present invention to prevent occurrence of a short circuit between coil ends despite an increase in the number of conductors to be held in slots.

It is yet another object of the present invention to reduce connections that require welding.

It is still yet another object of the present invention to provide an alternator capable of reducing noise by utilizing multiple sets of poly-phase windings while avoiding disadvantages resulted from complexity of the winding.

According to a first aspect of the present invention, one phase coil in a poly-phase winding is made of continuous wire that has only one crossing portion that links the same layers in different slots and two output portions. The other crossing portions of the phase coil links different layers in different slots. Consequently, a junction of coils is not created in a crossing portion at the coil end. This contributes to reduction in the cost of manufacture.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
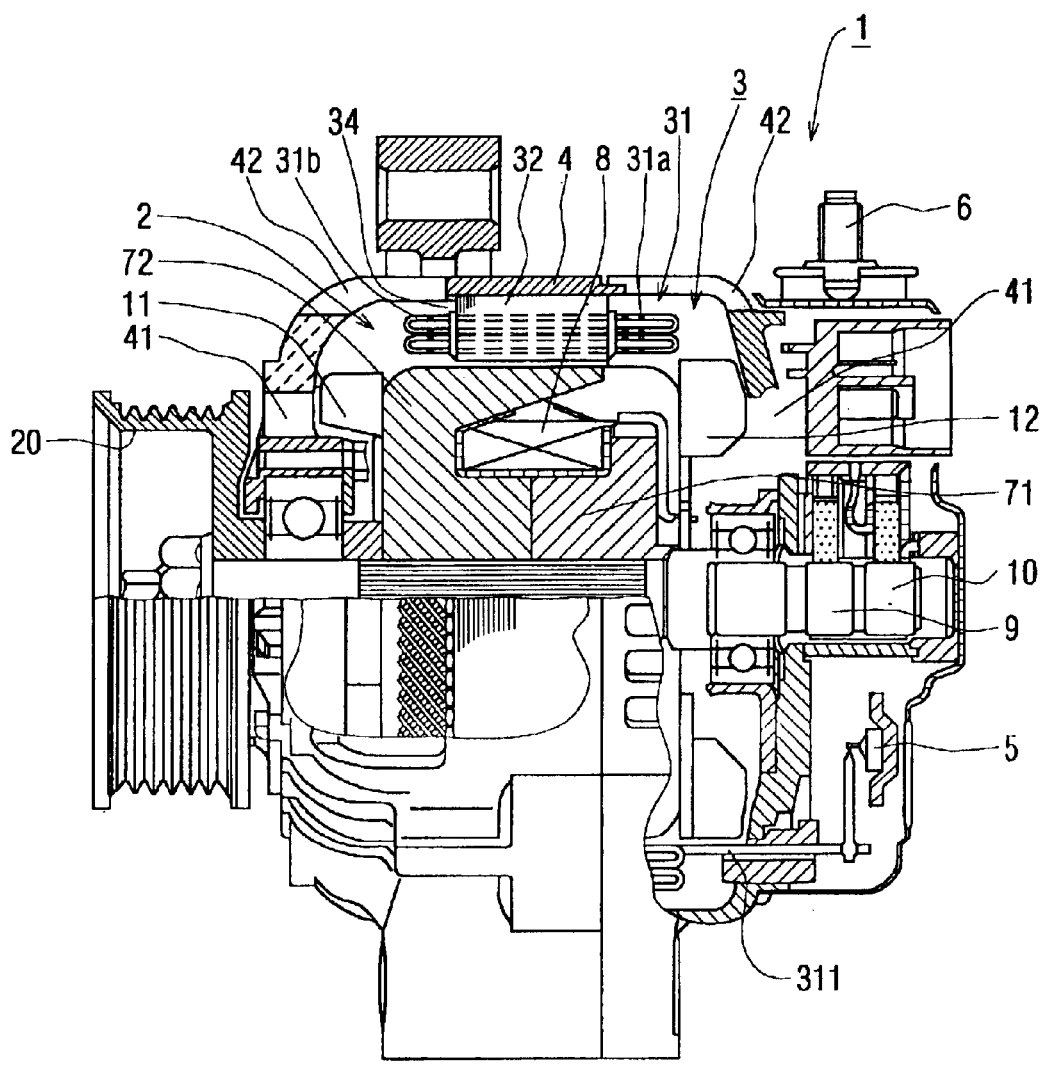
FIG. 1 is a cross sectional view showing an alternator for vehicles according to a first embodiment of the present invention.

Hereinafter embodiments of the present invention will be explained with reference to the drawings.

First Embodiment

FIG. 1 to FIG. 14 illustrates a first embodiment of the present invention. An alternator 1 is mounted on an engine that is a power source for a vehicle. The alternator 1 has a pulley 20 that is a part of a drive train for conveying a torque exerted by the engine to the alternator 1. The pulley 20 is fixed on a shaft that is rotatably supported on a frame 4. The shaft supports a rotor 2. Therefore the rotor 2 is rotated via the pulley 20.

A field winding 8 is mounted on the rotor 2 and is connected with slip rings 9, 10 for being supplied with field current. When exciting current flows into the field winding 8, the rotor 2 provides a plurality of north and south magnetic poles alternately arranged on outside surface thereof. The magnetic poles are provided on claw poles of pole cores 71, 72. In the embodiment, the rotor 2 has sixteen (16) magnetic poles including eight (8) north poles and eight (8) south magnetic poles.

A stator 3 is supported on the frame 4 so as to be located outside the rotor 2 to face the poles. The stator 3 has a stator winding 31 and a stator core 32. The stator winding 31 induces ac voltage due to a rotating field supplied by the rotor 2.

The stator winding 31 has a plurality of output portions 311, e.g., six, that extend beyond the stator 3 and are led to a rectifier 5. The rectifier 5 is mounted on the frame 4 and provides a rectifier circuit for rectifying two sets of three-phase outputs. A predetermined DC current is delivered through an output terminal 6 of the rectifier 5.

The alternator 1 has air cooling devices for cooling components such as the stator winding 31. The air cooling devices include fans 11, 12 rotatable together with the rotor 2 and capable of creating cooling air flow. The frame 4 provides cooling air passages via openings 41, 42. Cooling air is fed inwardly through the openings 41 located on both axial sides of the frame 4 in axial directions. The cooling air is discharged outwardly through the openings 42 located on an outside cylindrical wall of the frame 4.

The stator 32 is a laminated iron core having a plurality of slots formed on the inside thereof. Each of the slots has axial openings that open on both axial end of the stator 32 and an inside opening that opens on the inside of the stator core 32.

The stator winding 31 is held in the slots. An electrical insulation is provided between the stator winding 31 and the stator core 32. In this embodiment, inserting an insulating member, e.g., an insulator 34, between them, provides the electrical insulation.

Figure 8:
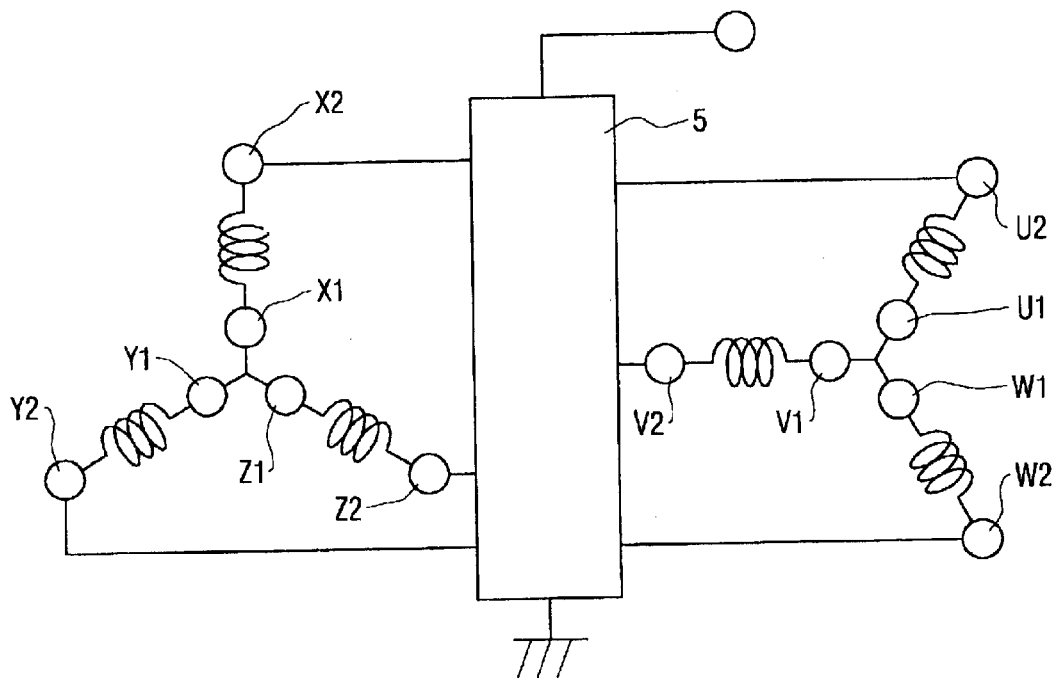
FIG. 8 is a circuit diagram showing two sets of three-phase windings according to the first embodiment of the present invention.

The stator winding 31 has a plurality of poly-phase windings being shifted in a predetermined electric phase angle that enables the stator winding 31 to cancel noise components. In this embodiment, the stator winding 31 has two of three-phase windings. The three-phase windings are shifted in 30°. Therefore, the stator winding 31 has an X-phase coil, a Y-phase coil and a Z-phase coil for a first three-phase winding and a U-phase coil, a V-phase coil and a W-phase coil for a second three-phase winding as shown in FIG. 8. The phase coils in one of the three-phase winding are shifted by an electrical angle of 120°. Each coil has terminals indicated by alphabetic identifier and numbers 1 and 2, such as X1 and X2. As shown in FIG. 8, according to the embodiment, at least twelve (12) terminals are formed. In order to complete the circuit including two sets of three-phase winding, at least eight (8) connections are needed.

In order to form two sets of three-phase winding, the stator core 32 has ninety-six (96) slots, since the rotor 2 has sixteen magnetic poles. Therefore, a pitch of the magnetic poles corresponds to six of the slots. The slots include a first group of slots and a second group of slots shifted by an electrical angle of 30° from the first group of slots. The stator winding 31 includes a first poly-phase winding disposed in the first group of slots and a second poly-phase winding disposed in the second group of slots. The output of the first poly-phase winding and the output of the second poly-phase winding output are independently outputted and supplied to the rectifier 5 respectively.

Figure 2:
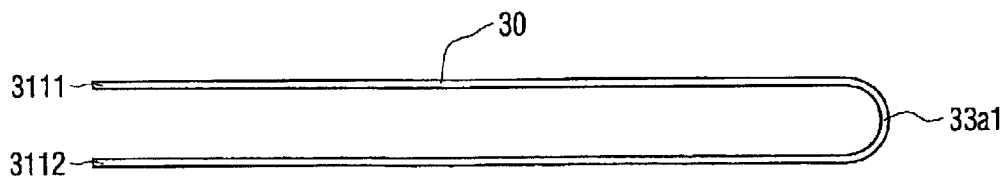
FIG. 2 is a plan view of a substantially U-shaped conductor to be formed into a phase coil according to the first embodiment of the present invention.
Figure 3:
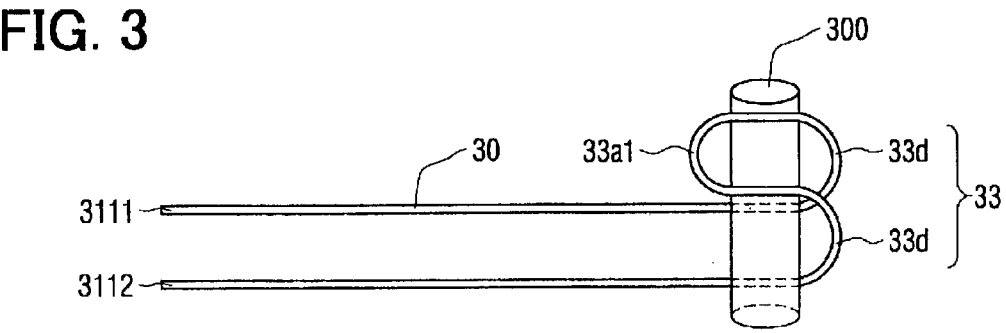
FIG. 3 is a plan view showing a process of twisting the substantially U-shaped conductor according to the first embodiment of the present invention.
Figure 4:
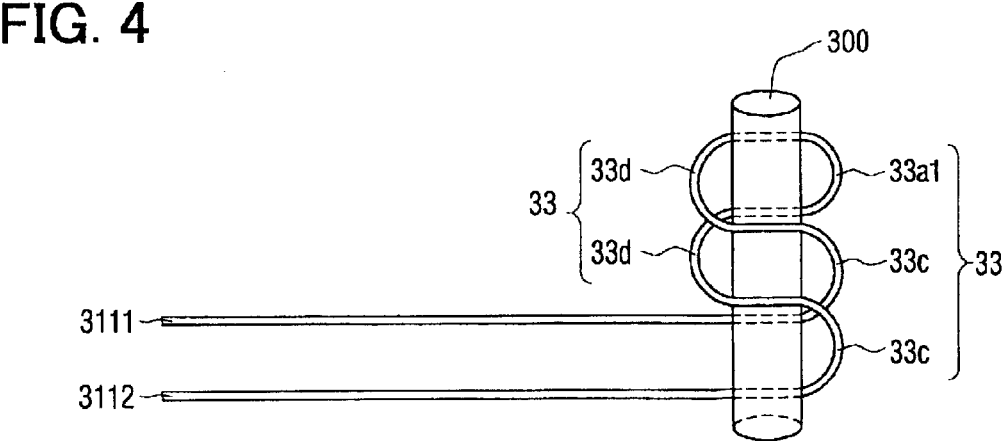
FIG. 4 is a plan view showing the process of twisting the substantially U-shaped conductor according to the first embodiment of the present invention.

Referring to FIG. 2, each of the phase coil X, Y, Z, U, V, and W are provided by a continuous wire 30 that is made of copper and has two ends 3111, 3112. The continuous wire is primarily bent in half to form substantially U-shaped member. A turning portion 33a1, which will be a same layer crossing portion, is formed. Then, the U-shaped wire is formed into a flat coil having a wave-winding configuration as shown in FIG. 3 and FIG. 4. Then, the flat coil is rolled twice while overlapping both ends. Finally, the rounded coil is inserted into the stator core 32.

Since each of the slots has a circumferential width just slightly wider than the width of the wire, middle parts of the rounded coil arranged in parallel are accommodated in the slots in a layered manner. As a result, each of the slots contains four layers arranged along a single line in a radial direction. Each layer is a conductor provided by one of the middle parts of the rounded coil. Both axial end portions of the rounded coil are protruded from both axial ends of the stator core 32 as a first coil end 31a and a second coil end 31b respectively. Both axial end portions of the rounded coil protruded from both axial ends of the stator core 32 are also referred to as crossing portions 33 that link the layers in different slots distanced by the magnetic pole pitch.

In a manufacturing process, the U-shaped wire 30 is wound on a winding jig 300 in a wave winding fashion to form the flat coil as shown in FIG. 3 and FIG. 4. First, a predetermined length of continuous wire is prepared. The continuous wire is bent in half to provide two arm portions and turning portion 33a1. The arm portions are formed in parallel each other, and distanced by the magnetic pole pitch, that is six of the slots.

In the beginning of forming process of the flat coil, two arms of the U-shaped wire 30 is placed on one side, front side, of the winding jig 300, and the turning portion 33a1 is placed on one lateral side of the winding jig 300. This section of the flat coil is referred to as a beginning section. Although some drawings illustrate only one wire for one phase coil such as X-phase coil, when forming the actual product, six U-shaped wires are arranged in parallel and twelve arms are simultaneously processed.

Then, on the other lateral side of the winding jig 300, two arms of the U-shaped wire 30 are simultaneously bent toward a winding direction. Simultaneously, two arms of the U-shaped wire 30 are twisted to place the remains of the arms on the other side, back side, of the winding jig 300. The arms are again bent to put the remains of the arms along the other side of the winding jig 300. Two arms are shifted by the magnetic pole pitch in the winding direction respectively, and are stacked in a layered fashion. Two crossing portions 33d, 33d are formed on the other lateral side of the winding jig 300.

Next, on the one lateral side of the winding jig 300, two arms of the U-shaped wire 30 are simultaneously bent and shifted the magnetic pole pitch in a winding direction. Simultaneously, two arms of the U-shaped wire 30 are twisted to place the remains of the arms on the one side, front side, again. As a result, two crossing portions 33c, 33c are formed on the other lateral side of the winding jig 300.

The steps shown in FIG. 3 and FIG. 4 are repeated for a predetermined times. As a result, a waveform coil that is stacked in two layers alternately is provided. The waveform coil may be seen as a coil spring. In this embodiment, the waveform coil has a length corresponding to circumferential length of the stator core 32. This waveform coil portion is referred to as a first section of the phase coil. The waveform coil of the first section occupies the first layer and the second layer when it is assembled on the stator core 32.

Then, two arms are bent and shifted the magnetic pole pitch in a winding direction. Simultaneously, two arms of the U-shaped wire 30 are twisted to place the remains of the arms on the same side, back side. This same side winding process forms a waveform coil stacked in a single direction. As a result, two crossing portions 33b1 and 33b2 are formed. This section of the waveform coil has a length corresponding to one magnetic pole pitch. This section is referred to as a second section. The waveform coil of the second section occupies the second layer and the third layer when it is assembled on the stator core 32.

The same side winding process is again performed on the other lateral side of the winding jig 300. After that, two arms are processed in the same manner as described in FIG. 3 and FIG. 4. As a result, a waveform coil arranged in an alternately layered fashion is again provided. Therefore, the crossing portions 33c and 33d are formed similar to the step before forming the crossing portions 33b1, 33b2. This section is referred to as a third section. The waveform coil of the third section occupies the third layer and the fourth layer when it is assembled on the stator core 32.

Finally, two ends 3111, 3112 are formed into terminals as the output portions. This section where the ends 3111, 3112 are placed is referred to as an end section. Then, the flat coil is rolled twice while overlapping the beginning section, the second section and the end section as shown in FIG. 6.

Figure 12:
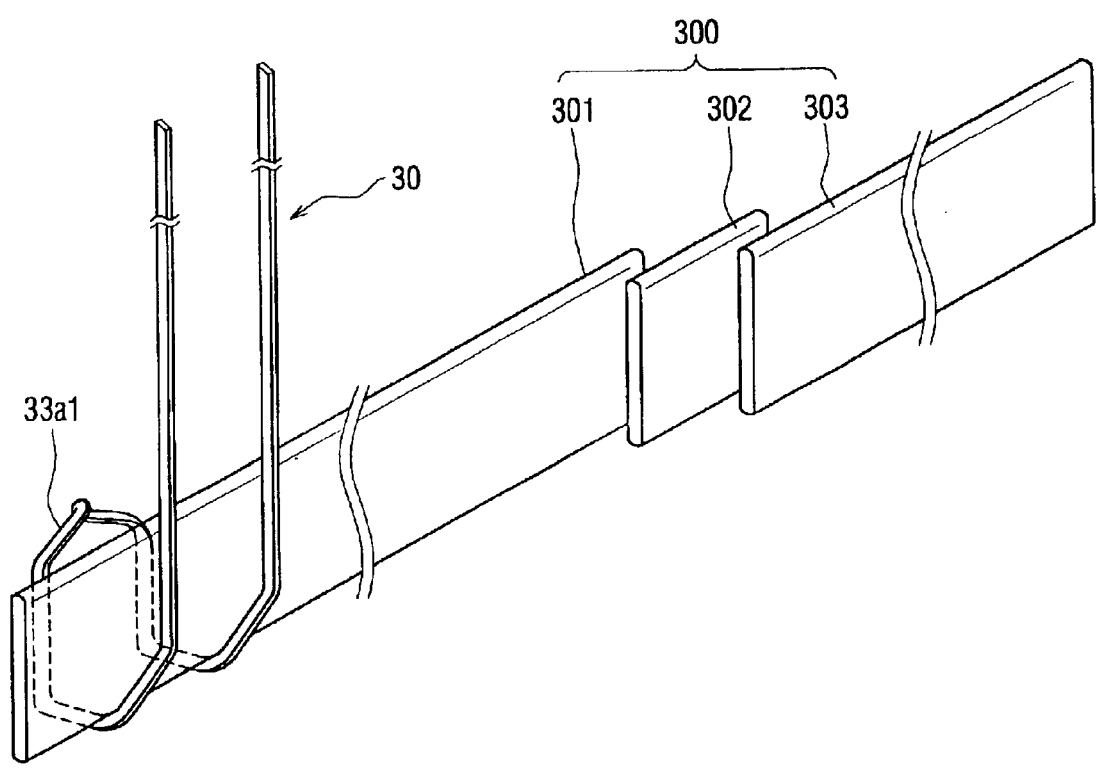
FIG. 12 is a perspective view showing a winding jig according to the first embodiment of the present invention.
Figure 13:
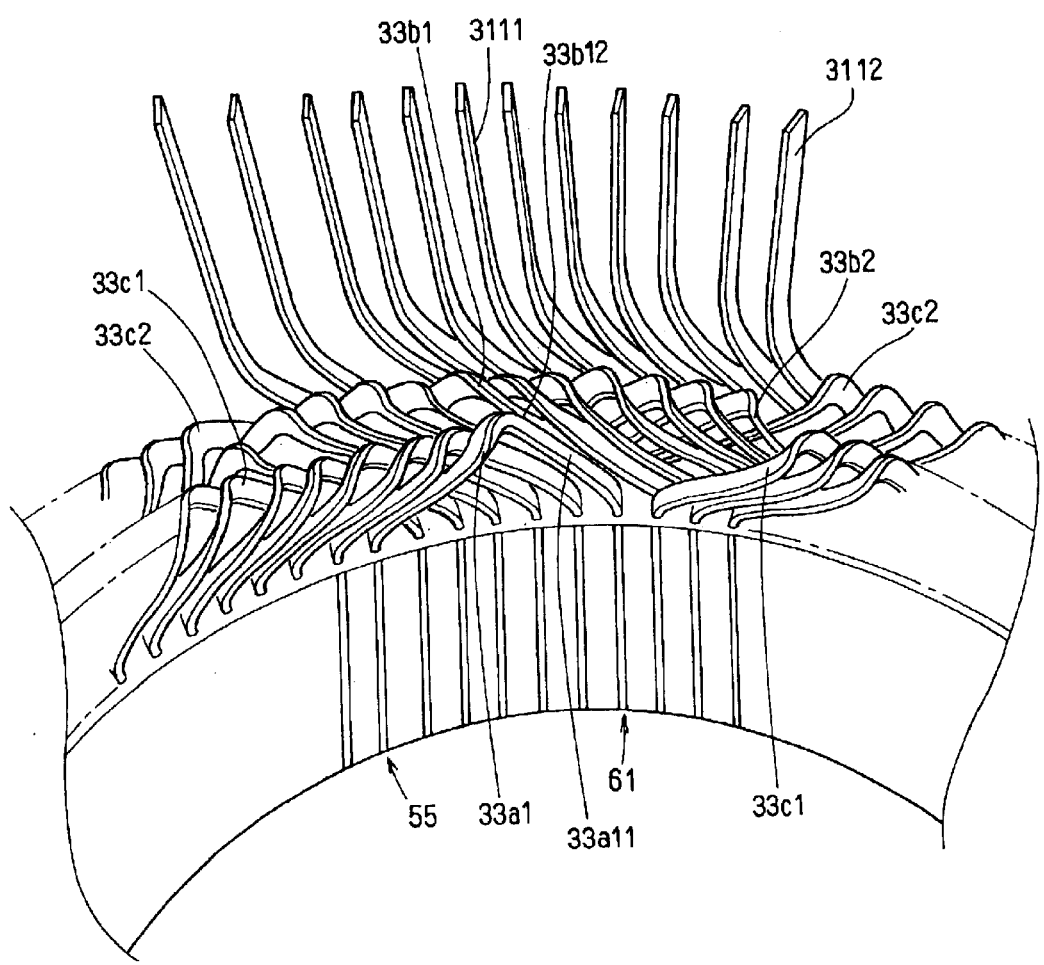
FIG. 13 is a perspective view showing a stator according to the first embodiment of the present invention.

The winding jig 300 may be formed with three plates 301, 302 and 303 as shown in FIG. 12. Each of the plates 301, 302 and 303 has a thin rectangular cross-section and predetermined length along the winding direction of the waveform winding. The plates are placed in parallel with each other while arranging the longitudinal direction of the plates along the winding direction. FIG. 13 shows a winding step corresponding to the step shown in FIG. 3. The first section of the phase winding is wound on the jig 301. The jig 302 defines the crossing portions 33b formed in the same side winding process described above. Therefore, in case of using the jig 302, the same side winding process is carried out by winding the arms of the wire 30 in the opposite direction from the first section. For example, the arms of the wire 30 are wound on the jig 301 in a counter clockwise direction, then the arms of the wire 30 wound on the jig in a clockwise direction. As a result, the second section is wound on the jig 302. In the next step, the arms of the wire 30 are wound on the jig 303 in the counter clockwise direction to form the third section. Therefore, the third section is wound on the jig 303. Then the wining jigs 301, 302 and 303 are removed from the coil.

Figure 5:
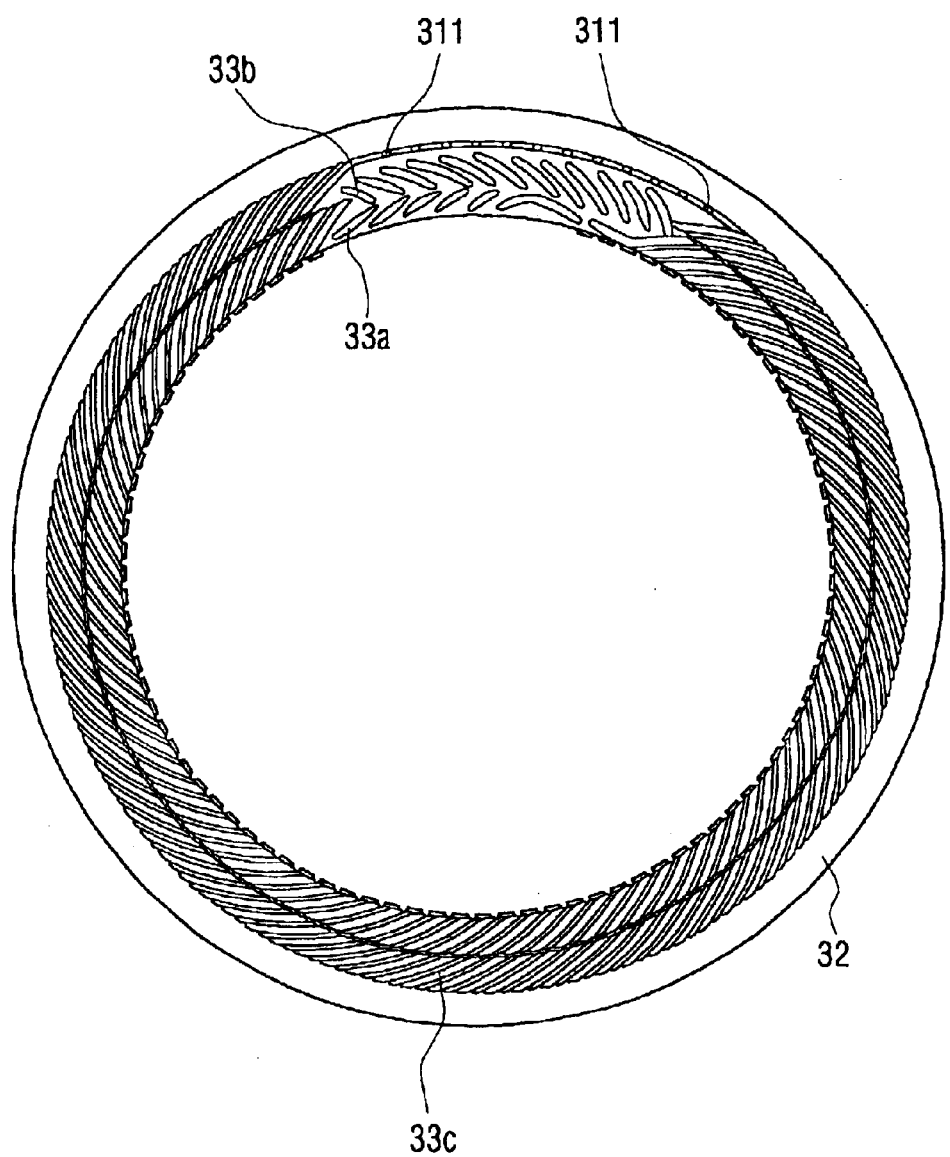
FIG. 5 is a plan view showing a front side of a stator according to the first embodiment of the present invention.
Figure 6:
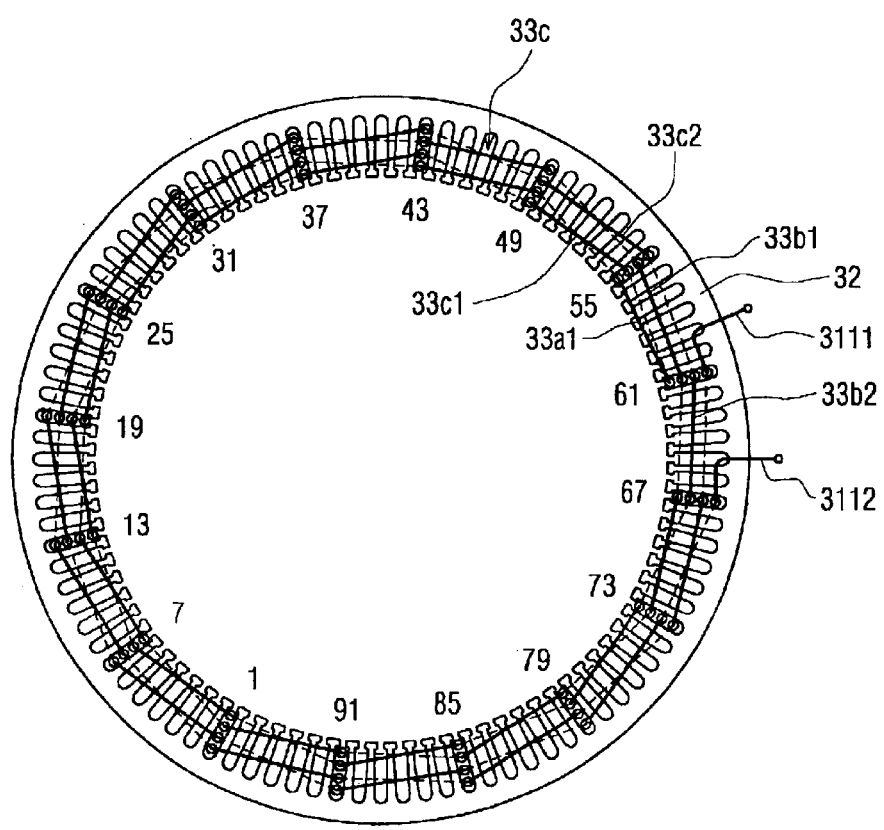
FIG. 6 is a wiring diagram showing one phase coil according to the first embodiment of the present invention.
Figure 7:
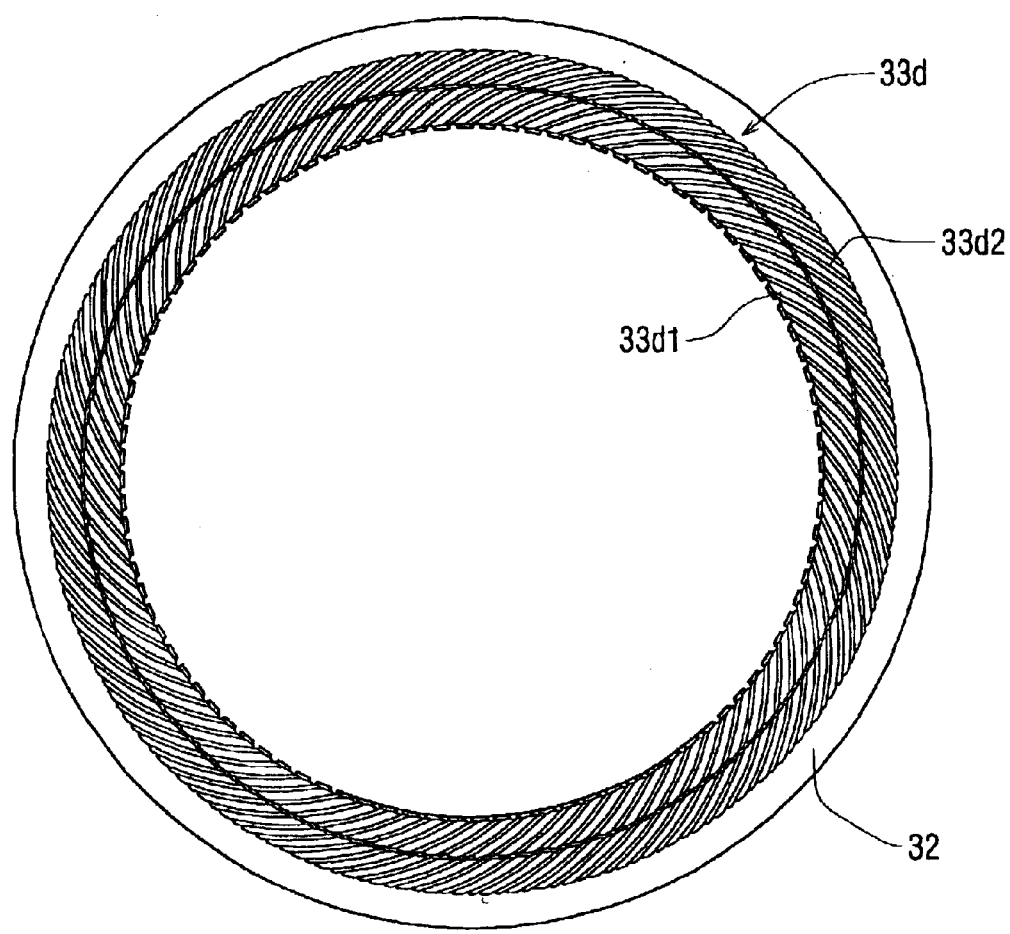
FIG. 7 is a plan view showing a rear side of the stator according to the first embodiment of the present invention.

FIG. 5, FIG. 6, and FIG. 7 show the winding assembled on the stator core 32. Each of the crossing portions has a turning portion and two inclined portions. In FIG. 5 and FIG. 7, the turning portions are mainly seen and the inclined portions are hidden below the turning portions.

The winding has six crossing portions 33a each of that links the same layers in different slots. For example, referring to FIG. 6, the crossing portion 33a1 links most inside layers, the first layers, in 55th slot and 61st slot. The crossing portions 33a are the same layer crossing portions. The crossing portions 33a may link another layers such as the fourth layers. The layers may be identified by location of the conductor in a depth direction of the slot, that is a radial outward direction. Therefore, the fourth layer located on the most outside in the radial direction may be referred to as a deepest layer.

Consequently, as shown in FIG. 5, the crossing portions 33a, 33b, 33c, and the output portions 311 are arranged on the first coil end 31a. The crossing portions 33c link adjoining different layers in different slots. For example, the crossing portion 33c1 indicated in FIG. 6 belongs to the first section and links the second layer in the 55th slot and the first layer in the 49th slot. The crossing portion 33c2 indicated in FIG. 6 belongs to the third section and links the fourth layer in the 55th slot and the third layer in the 49th slot.

The crossing portions 33b link adjoining different layers in different slot. For example, the crossing portion 33b1 indicated in FIG. 6 belongs to the second section and links the second layer in the 61st slot and the third layer in the 55th slot. The crossing portion 33b2 indicated in FIG. 6 belongs to the second section and links the second layer in the 67th slot and the third layer in the 61st slot.

The inclined portions belonging to the crossing portions other than the same layer crossing portions 33a are inclined in opposite directions with respect to the other inclined portion adjoining in a radial direction. The crossing portions 33c, 33b, and 33d all link different layers. The crossing portions 33c and 33d link a pair of the first layer and the second layer and a pair of the third layer and the fourth layer. The crossing portions 33b link a pair of the second layer and the third layer. The crossing portion 33b radially adjoining the same layer crossing portion 33a links a pair of the layers that is different from a pair of layers that are linked by the other crossing portions 33c, 33d. Therefore, the crossing portions 33b provide links that are different from the other links provided by the crossing portions 33c, 33d, and are shifted by one layer from the other links provided by the crossing portions 33c, 33d.

At least one of the layers that are linked via the crossing portions 33b is disposed in the same slot of which another layer is linked via the same layer crossing portions 33a. Therefore, the crossing portion, i.e., the crossing portion 33b, adjoining the same layer crossing portion links a pair of layers that is different from the other pair linked by the other crossing portions linking different layers.

The output portions 311 and the same layer crossing portions 33a are located in the same circumferential region of the stator 3. The region where the output portions 311 are located and the region where the same layer crossing portions 33a are located are overlapped each other. The output portions 311 are placed radial outside of the same layer crossing portions 33a. The region where the output portions 311 are located and the region where the crossing portions 33b1, 33b2 are located are also overlapped each other. This arrangement simplifies configuration of the first coil end 31a and enables to improve cooling efficiency of the output portions 311.

Referring to FIG. 7, the crossing portions 33d are arranged on the second coil ends. The crossing portion 33d1 belongs to to the first section and links the first layer and the second layer in different slots. The crossing portion 33d2 belongs to to the second section and links the third layer and the fourth layer in different slots. As a result, the stator winding 31 has six crossing portions 33a each linking the same layers.

The length of the substantially U-shaped wire 30 may be adjusted in order to vary the number of conductors to be accommodated in one slot. For example, the U-shaped wire 30 may has a length that is capable of forming additional second section and third section of the coil, and provides six conductors per slot. This feature enables easy change of output characteristic and product variations in low cost.

Figure 9:
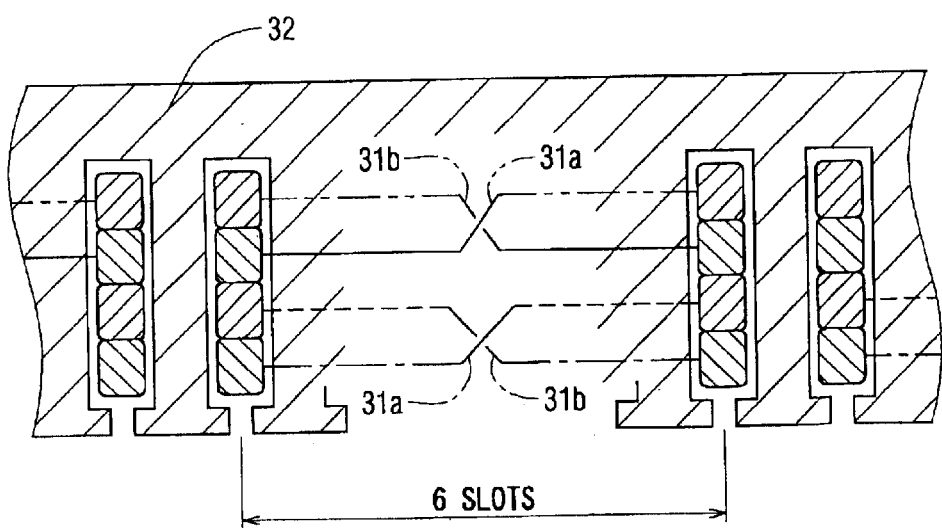
FIG. 9 is a cross sectional view showing layered conductors in slots and their connections according to the first embodiment of the present invention.

FIG. 9 shows schematic cross sectional view of the stator 3. The wire has a rectangular cross section. The crossing portions are located as indicated with a single chain line, a broken line, a solid line, and a double chain line in that order from the radial inside of the slots.

Figure 10:
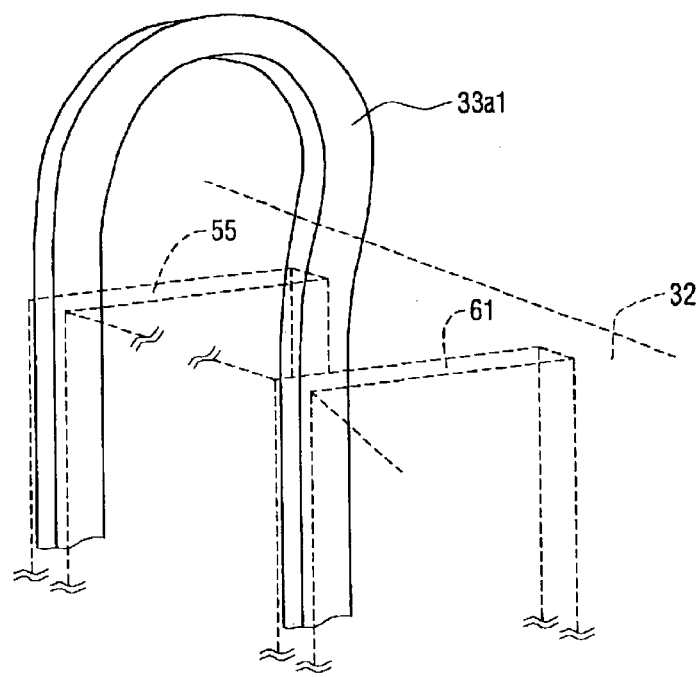
FIG. 10 is a perspective view showing a crossing portion that links the same layers in different slots according to the first embodiment of the present invention.

FIG. 10 shows a detail of the same layer crossing portion 33a. On the first coil end 31a, in order to make the crossing portion 33a1 to link the same layers in the 55th slot and the 61st slot, the crossing portion 33a1 is twisted in a substantially circular shape. The view along the circumferential direction of the stator core 32 may be seen like the shape of question symbol "?" as shown in FIG. 10. It is possible to lower the height of the coil end. In addition, the electrical resistance offered by the coil end can be minimized. This contributes to realization of a compact design and high power.

Figure 11:
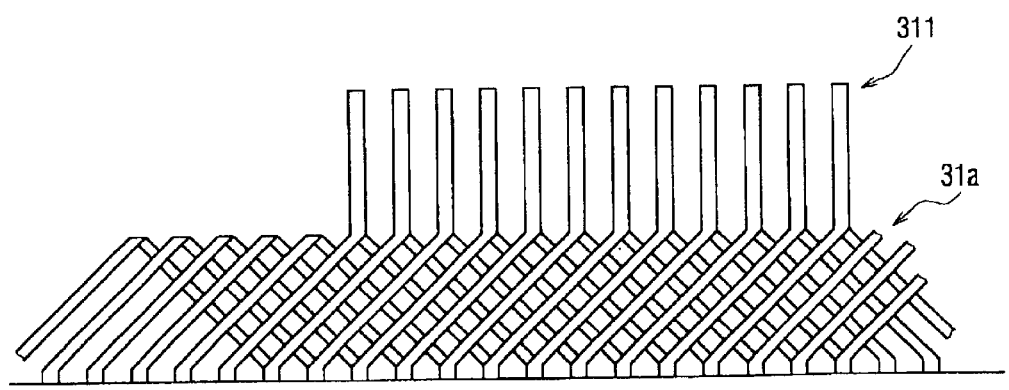
FIG. 11 is a partial side view of a coil end showing output portions 311 according to the first embodiment of the present invention.

Since six of U-shaped wires are simultaneously wound, the output portions 311 are lined up along the stator 3 as shown in FIG. 11. According to the output portions arrangement as shown in FIG. 11, it is possible to reduce distance between adjoining ones of the output portions, and to ease joining the output portions. The cost of manufacture can be minimized. Moreover, since it is unnecessary to lay down the output portions, the vibration resistance of the alternator improves. In this embodiment, the output portions 311 are distanced by a distance between adjoining slots.

Figure 14:
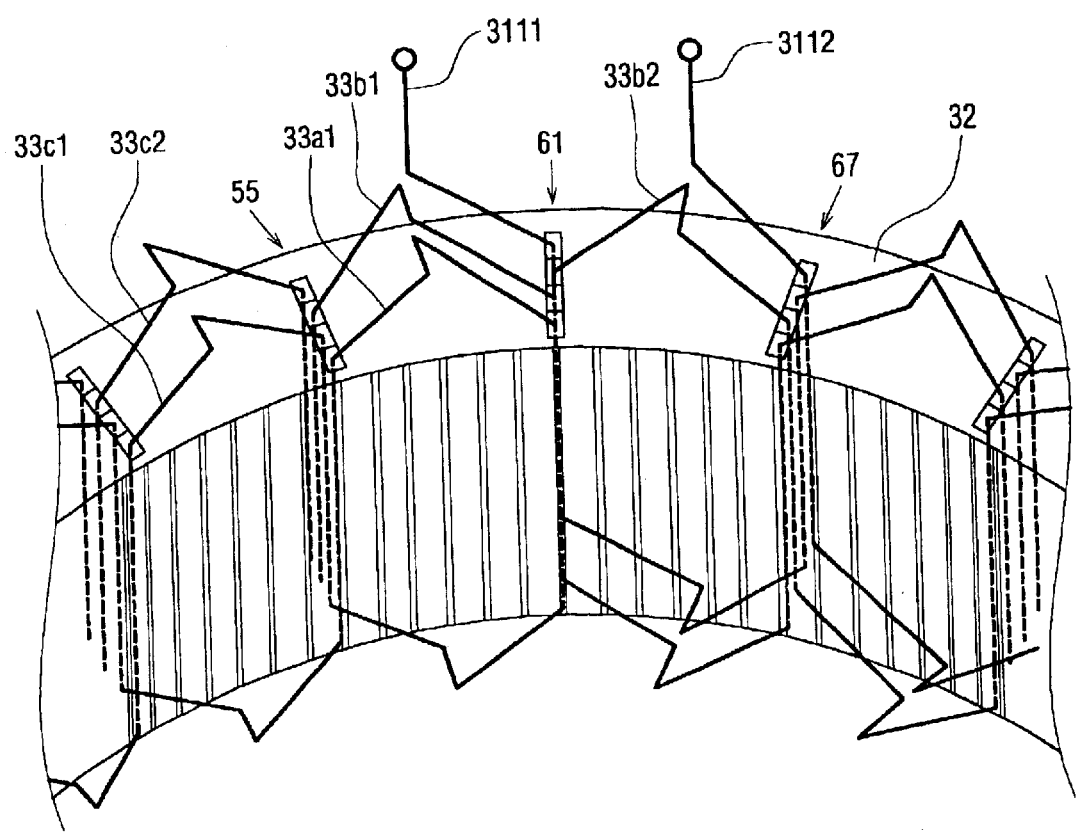
FIG. 14 is a perspective view showing a winding in a schematic fashion according to the first embodiment of the present invention.

FIG. 13 is a perspective view showing a part of the stator 3. FIG. 14 is a perspective view showing a winding on the stator 3 in a schematic fashion. FIG. 13 shows a part of the stator 3 in which the same layer crossing portions, the crossing portions in the second section and the terminals are located. FIG. 14 shows the same part as shown in FIG. 13. In FIG. 13, and FIG. 14, portions belonging to to the X-phase coil are indicated with reference numbers. The same layer crossing portions 33a1, the crossing portions 33b1, 33b2 in the second section, and the terminals 3111, 3112 are illustrated in FIG. 13 and FIG. 14.

Each of the same layer crossing portions has an inside inclined portion and an outside inclined portion. Similarly, each of the crossing portions in the second section has an inside inclined portion and an outside inclined portion. Some of the crossing portions in the second section are located radial outside of the same layer crossing portions. The outside inclined portion of the same layer crossing portion and the inside inclined portion of the crossing portion in the second section are formed so as to incline in the same direction. In FIG. 13, and FIG. 14, for example, the outside inclined portion 33a11 and the inside inclined portion 33c12 are arranged in parallel. The other inclined portions are formed so that two inclined portions adjoining in a radial direction incline in opposite directions and cross each other. Therefore, in the first coil end 31a, almost all the inclined portions cross the other inclined portions in adjacent layers, but only the inclined portions that form the crossing portions of the second section are arranged in parallel with the other inclined portions in adjacent layers. In other words, the inclined portions of the same layer crossing portions are arranged in parallel with the other inclined portions that belongs to the crossing portions in the second section located radial inside or outside of the same layer crossing portions.

Since the crossing sections 33b1, 33b2 links the second layer and the third layer, the first one of the same layer crossing portion 33a1 and the last one of the crossing portion 33c1 in the first section define a circumferential gap between them. The circumferential gap is located above the first layer. The circumferential gap has a triangular shape that is widened toward the axial end of the first coil end 31a.

According to the embodiment, it is possible to reduce the number of portions that require joining, e.g., welding. This contributes to a reduction in the cost of joining, e.g., welding. Furthermore, it is possible to lower the height of the coil end. Consequently, an electrical resistance offered by the coil end is minimized. This contributes to realization of high power and a compact design.

Moreover, positions to which output portions are led out are mutually adjoining. It is therefore easy to join the conductors assigned to respective phases and included in the poly-phase winding. A man-hour can therefore be reduced.

Moreover, it is possible to reduce wires that are disposed to reach to places from which wires are led out. This contributes to improvement of vibration resistance.

Moreover, since cooling air flows towards the output portions 311, the efficiency in cooling the output portions led to the rectifier can be improved. The thermal effect on the rectifier can therefore be minimized. This contributes to improvement of heat resistance.

Figure 15:
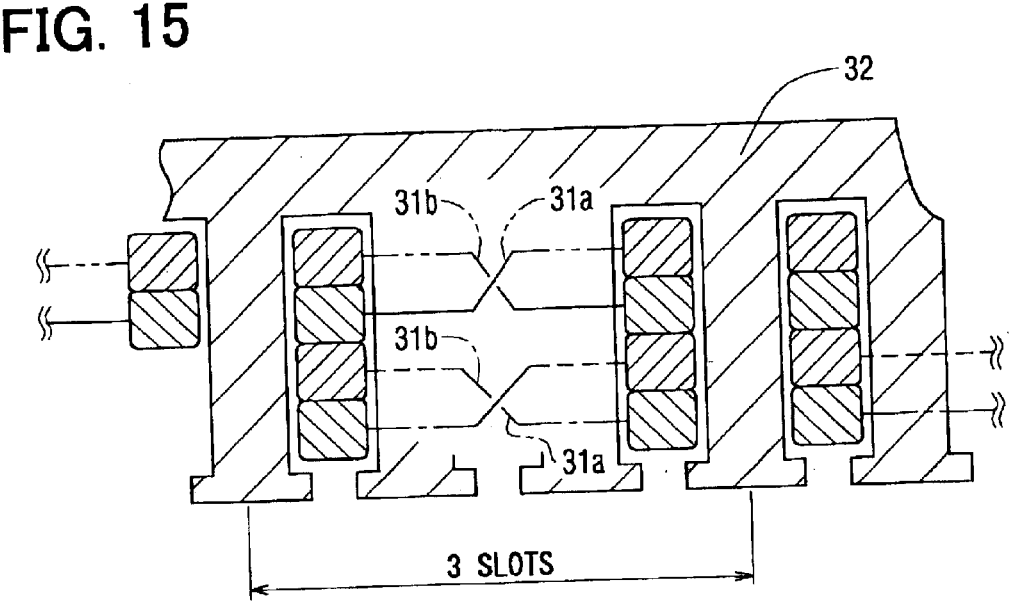
FIG. 15 is a cross sectional view showing layered conductors in slots and their connections according to a second embodiment of the present invention.
Figure 16:
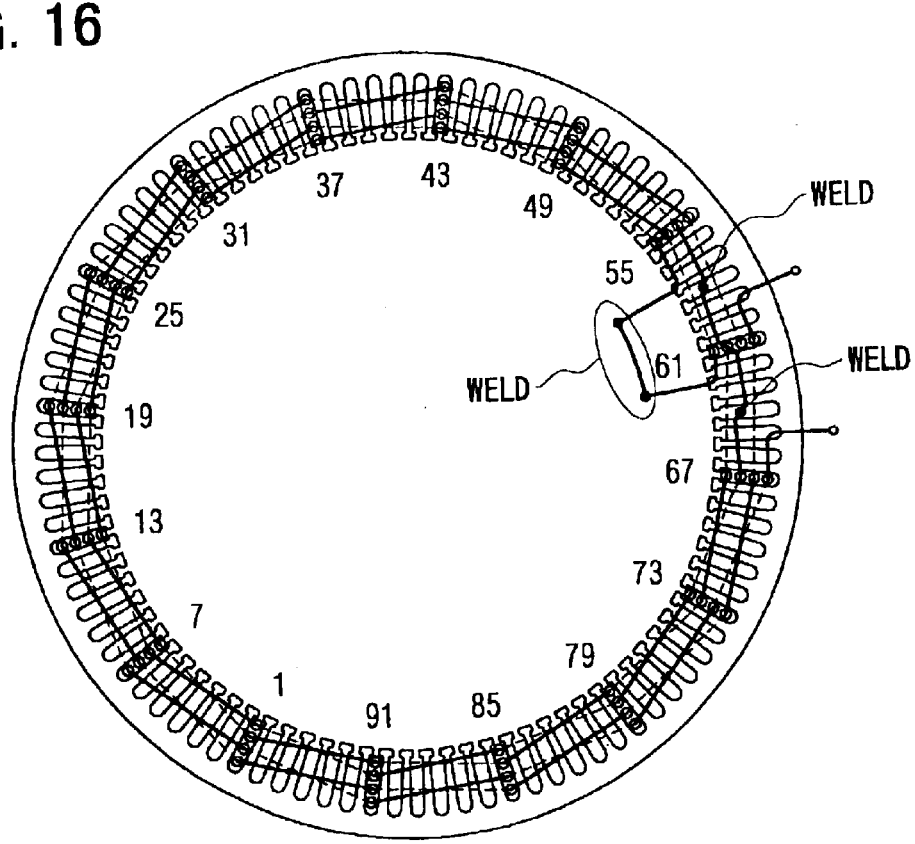
FIG. 16 is a front view showing connections requiring welding according to a related art.

Alternative to the first embodiment, the present invention can be applied to a stator core that has 48 slots as shown in FIG. 15. In this case, the pitch between adjoining ones of the north and south magnetic poles of the rotor corresponds to three inter-slot pitches. The second embodiment can provide similar advantages as the first embodiment.

Moreover, the number of north and south magnetic poles or the number of slots each of which is connected to an adjoining slot in series with each other can be determined properly according to a required output characteristic or the like. Moreover, a junction of coils may not be a Y-junction but may be a delta junction or a combination thereof.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An alternator for vehicles comprising:
   a rotor that has a plurality of claw-shaped magnetic poles; and a stator including a stator core having a plurality of slots, and a stator winding accommodated in the slots to form a plurality of layers in one slot, wherein the stator winding comprises a poly-phase winding including a plurality of phase coils, the phase coils are made of continuous wires, and each of the phase coils has a plurality of crossing portions that provides coil ends on both ends of the stator core and link the layers in different slots distanced by a magnetic pole pitch of the rotor in series with each other, the crossing portions including a single same layer crossing portion that links the same layers in different slots, and other crossing portions that link different layers in different slots.

2. The alternator for vehicles according to claim 1, wherein each of the crossing portions includes a pair of inclined portions inclining in opposite directions each other and a turned portion connecting the pair of the inclined portions, and the crossing portion radially adjoining the same layer crossing portion links a pair of the layers that is different by one layer from a pair of layers linked by the other crossing portions other than the same layer crossing portion.

3. The alternator for vehicles according to claim 2, wherein the same layer crossing portion links the first layers located on radial one end of the slots, the crossing portion radially adjoining the same layer crossing portion links the second layer and the third layer, and the other crossing portions include a first group of the crossing portions linking the first layer and the second layer and a second group of the crossing portions linking the third layer and the fourth layer.

4. The alternator for vehicles according to claim 2, wherein the inclined portion of the same layer crossing portion and the inclined portion of the crossing portion that adjoins the same layer crossing portion in a radial direction are arranged in parallel.

5. The alternator for vehicles according to claim 2, wherein the same layer crossing portion and the other crossing portion define a gap in a circumferential direction, the gap being widened toward an axial end.

6. The alternator for vehicles according to claim 1, wherein the phase coil includes the output portions that are located on a radial inside or outside of the same layer crossing portions.

7. The alternator for vehicles according to claim 1, wherein the same layer crossing portions are formed in a substantially circular shape.

8. The alternator for vehicles according to claim 1, wherein the phase coil includes the output portions that are led out from the same layers in adjoining slots.

9. The alternator for vehicles according to claim 1, wherein the, continuous wire is provided by a substantially U-shaped wire having a turning portion for the same layer crossing portion, the substantially U-shaped wire being formed into a layered waveform coil.

10. The alternator for vehicles according to claim 1, wherein the slots include a first group of slots and a second group of slots shifted by an electrical angle of 30° from the first group of slots, and the stator winding includes a first poly-phase winding disposed in the first group of slots and a second poly-phase winding disposed in the second group of slots, the first poly-phase winding and the second poly-phase winding outputting respectively.

* * * * *